(12) United States Patent
Gabrielli et al.

(10) Patent No.: US 9,284,037 B2
(45) Date of Patent: Mar. 15, 2016

(54) HOVER-CAPABLE AIRCRAFT

(71) Applicant: AGUSTAWESTLAND S.p.A., Samarate (IT)

(72) Inventors: Andrea Gabrielli, Samarate (IT); Giuseppe Gasparini, Samarate (IT)

(73) Assignee: AGUSTAWESTLAND S.P.A., Samarate (IT)

( * ) Notice: Subject to any disclaimer, the term of this patent is extended or adjusted under 35 U.S.C. 154(b) by 289 days.

(21) Appl. No.: 14/058,452

(22) Filed: Oct. 21, 2013

(65) Prior Publication Data

US 2014/0299710 A1    Oct. 9, 2014

(30) Foreign Application Priority Data

Oct. 26, 2012  (EP) .................................... 12425174

(51) Int. Cl.
| | | |
|---|---|---|
| *B64C 27/52* | (2006.01) | |
| *B64C 1/40* | (2006.01) | |
| *B64C 27/00* | (2006.01) | |
| *F02K 1/34* | (2006.01) | |
| *B64C 27/12* | (2006.01) | |
| *B64D 35/00* | (2006.01) | |

(52) U.S. Cl.
CPC . *B64C 1/40* (2013.01); *B64C 27/00* (2013.01); *B64C 27/12* (2013.01); *B64D 33/06* (2013.01); *B64D 35/00* (2013.01)

(58) Field of Classification Search
CPC ............ B64C 1/40; B64C 33/06; B64C 35/00
See application file for complete search history.

(56) References Cited

U.S. PATENT DOCUMENTS

| | | | |
|---|---|---|---|
| 4,216,924 A | 8/1980 | Fradenburgh | |
| 7,137,590 B2 * | 11/2006 | Sandrart et al. | ............ 244/17.25 |
| 7,578,369 B2 * | 8/2009 | Francisco et al. | ............ 181/213 |
| 7,938,618 B2 * | 5/2011 | Baude | ............ 415/119 |
| 2008/0185217 A1 | 8/2008 | Baude | |

FOREIGN PATENT DOCUMENTS

GB           984 817         3/1965

* cited by examiner

*Primary Examiner* — Brian M O'Hara
(74) *Attorney, Agent, or Firm* — Leason Ellis LLP

(57) ABSTRACT

A hover-capable aircraft having propulsion means; at least one rotor; transmission means for transmitting power from the propulsion means to the rotor and lubricated with a lubricant; a heat exchanger, which receives the heated lubricant from the transmission means and feeds the cooled lubricant back to the transmission means; and a fan for producing airflow through the heat exchanger to cool the lubricant, and which has an impeller with blades, and an exhaust pipe for expelling the hot air produced by cooling the lubricant; at least one portion of the wall of the exhaust pipe has dissipating means designed to selectively absorb pressure waves in a given frequency band related to the rotation speed of the impeller and to the number of blades of the impeller.

9 Claims, 4 Drawing Sheets

HOVER-CAPABLE AIRCRAFT

The present invention relates to a hover-capable aircraft, such as a convertiplane or a helicopter, to the latter of which the following description refers purely by way of example.

CROSS-REFERENCE TO RELATED APPLICATION

The present application claims priority to European Patent Application No. 12425174.5, filed Oct. 26, 2012, which is hereby incorporated by reference in its entirety.

BACKGROUND OF THE INVENTION

As is known, in the aircraft industry, reducing noise, both external and inside the cabin, is becoming a major design issue.

Noise is mainly produced by the engines, the auxiliary components powered by the engines, moving parts, and airflow over the airframe, and propagates both directly to the outside, and into the aircraft itself, mainly along airflow and structural paths, i.e. the points connecting the cover panels to the fuselage.

Noise is reduced both by working directly on the noise-source components, and by applying noise-damping material between the structural frame of the helicopter and the cover panels, to minimize noise propagation from the outside to the inside of the cabin.

SUMMARY OF THE INVENTION

It is an object of the present invention to provide a hover-capable aircraft designed to significantly reduce operating noise as compared with known aircraft.

According to the present invention, there is provided a hover-capable aircraft comprising:
 propulsion means;
 at least one rotor;
 transmission means for transmitting power from said propulsion means to said rotor and lubricated with a lubricant;
 a heat exchanger, which receives the heated lubricant from said transmission means and feeds the cooled lubricant back to the transmission means; and
 a fan for producing airflow through said heat exchanger to cool said lubricant, and which comprises an impeller with blades, and an exhaust pipe for expelling the hot air produced by cooling said lubricant;
 at least one portion of the wall of said exhaust pipe comprising dissipating means designed to selectively absorb pressure waves in a given frequency band related to the rotation speed of said impeller and to the number of blades of the impeller.

BRIEF DESCRIPTION OF THE DRAWINGS

A preferred non-limiting embodiment of the present invention will be described by way of example with reference to the accompanying drawings, in which.

DETAILED DESCRIPTION OF THE INVENTION

Figure 1:
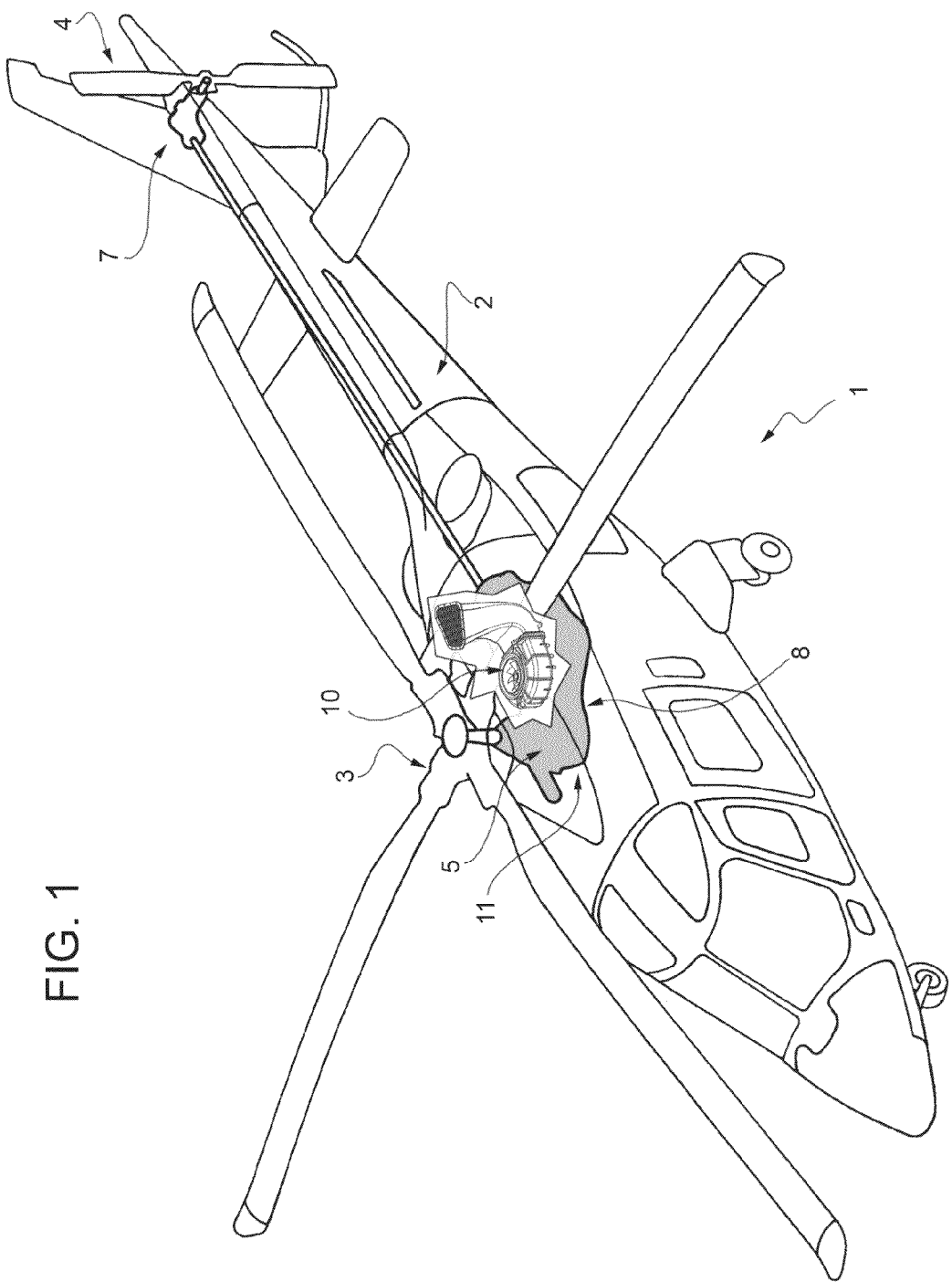
FIG. 1 shows a view in perspective of a hover-capable aircraft, in particular a helicopter, in accordance with the teachings of the present invention.

Number 1 in FIG. 1 indicates as a whole a hover-capable aircraft—in the example shown, a helicopter—in accordance with the teachings of the present invention.

Helicopter 1 substantially comprises a fuselage 2; a main rotor 3 mounted on fuselage 2 to rotate in a first plane and produce lift to sustain helicopter 1 as a whole; and a tail rotor 4 at the rear end of fuselage 2. More specifically, rotor 4 rotates in a second plane crosswise to the first, to counteract the rotational torque produced on fuselage 2 by rotor 3.

Helicopter 1 also comprises a main transmission 5 for transmitting power from a turbine 6 (shown schematically in FIG. 2) to a drive shaft (not shown) of rotor 3; and an auxiliary transmission 7 powered by transmission 5 and itself powering rotor 4.

Both transmissions 5 and 7 are lubricated constantly with lubricant, e.g. oil, circulating in a known fluidic circuit (not shown) of helicopter 1.

The lubricant obviously heats in use and must be cooled constantly, so transmission 5 is associated with a cooling system 8 comprising a heat exchanger 9 and a fan 10. Transmission 5 and cooling system 8 together define an actuator assembly 11 of helicopter 1.

More specifically, heat exchanger 9 cools the lubricant of transmission 5; heat exchanger 9 therefore receives the heated lubricant from transmission 5 along an inlet pipe 12, and feeds the cooled lubricant back to transmission 5 along an outlet pipe 13.

Inside heat exchanger 9, the lubricant is cooled by air from the outside.

More specifically, fan 10, connected mechanically to transmission 5, produces airflow through heat exchanger 9 in a direction crosswise to pipes 12 and 13 to cool the lubricant.

Figure 2:
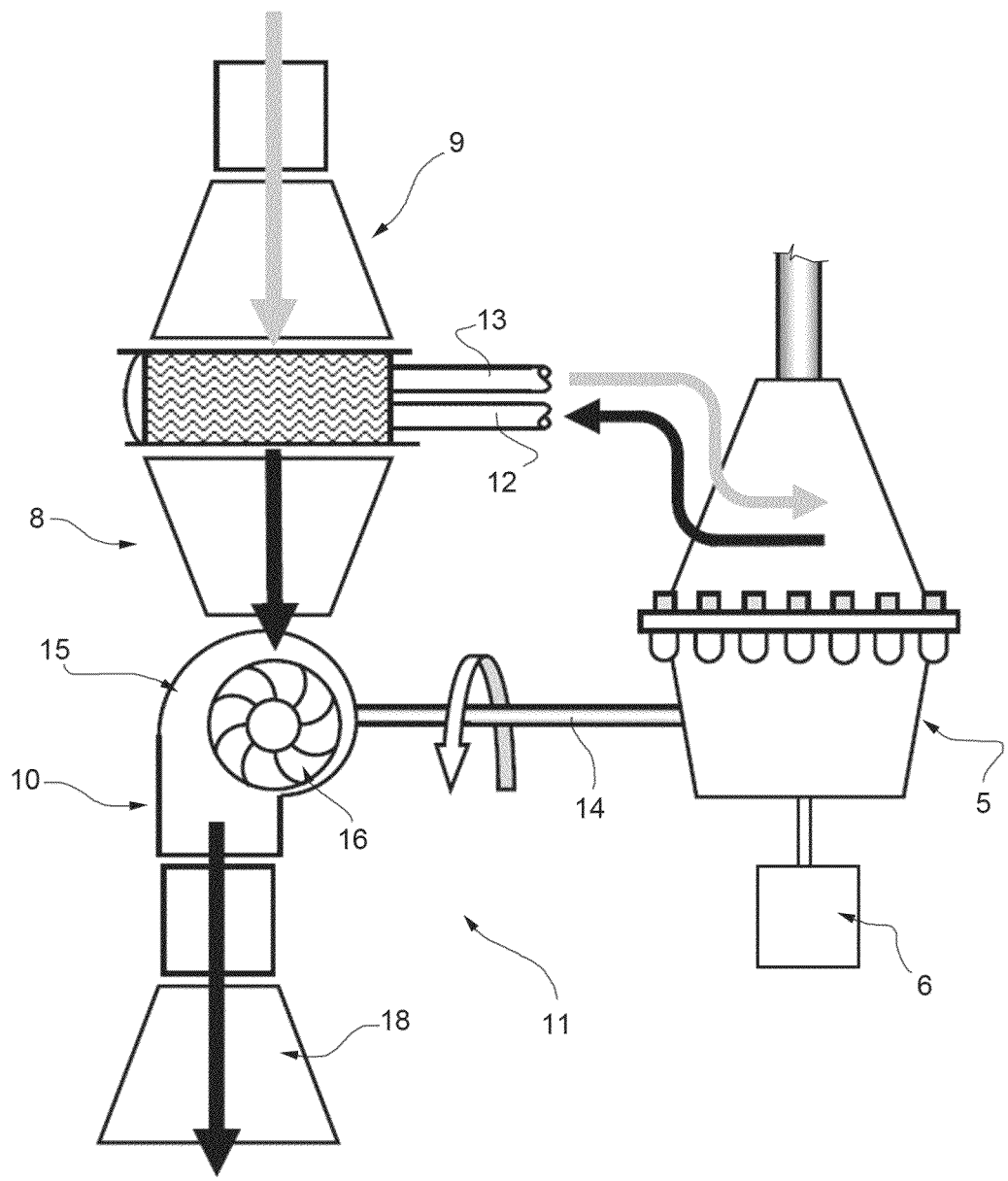
FIG. 2 shows a schematic of an actuator assembly of the FIG. 1 aircraft, fitted with noise-reducing features in accordance with the present invention.
Figure 3:
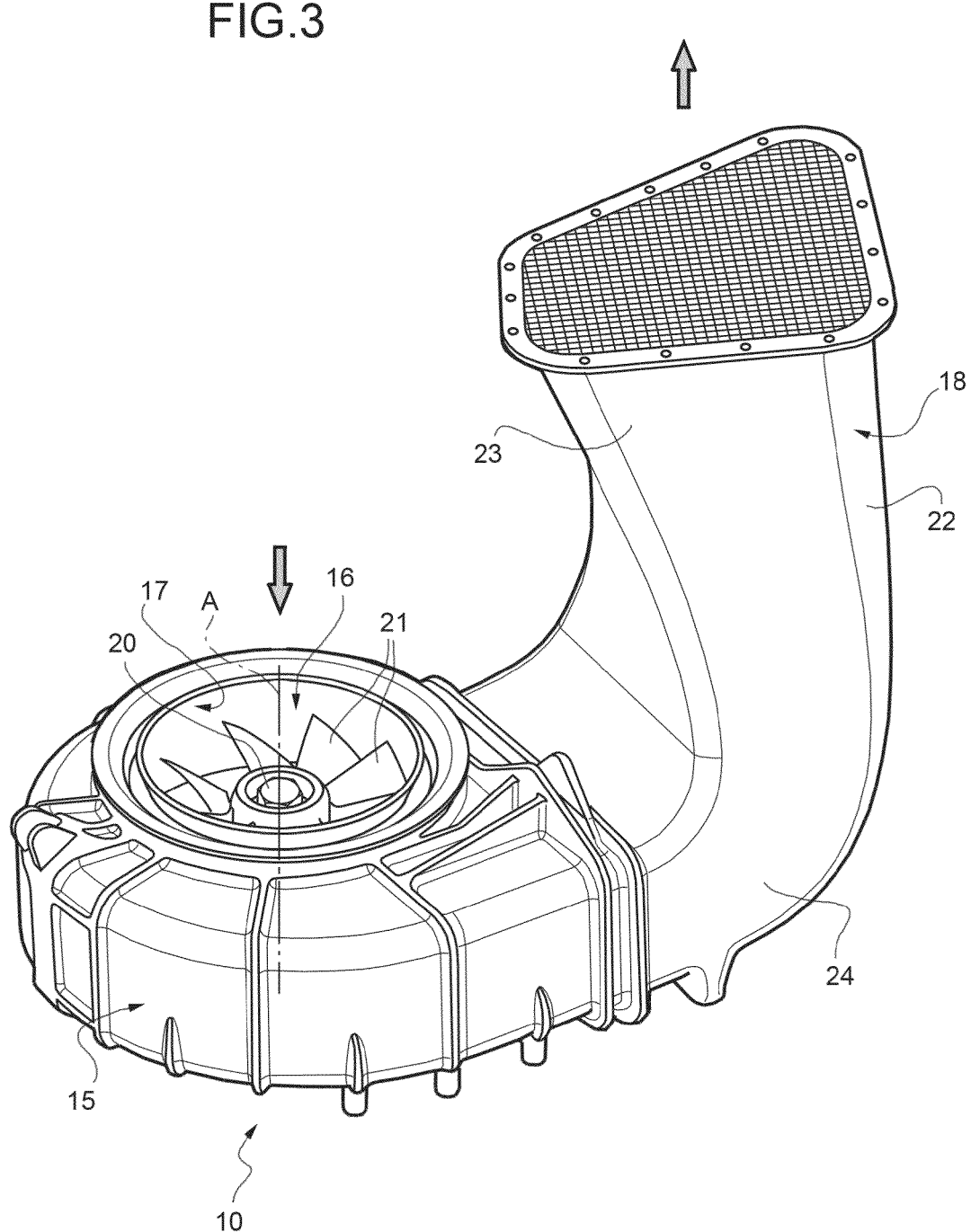
FIG. 3 shows a larger-scale view in perspective of a fan of the FIG. 2 actuator assembly.
Figure 4:
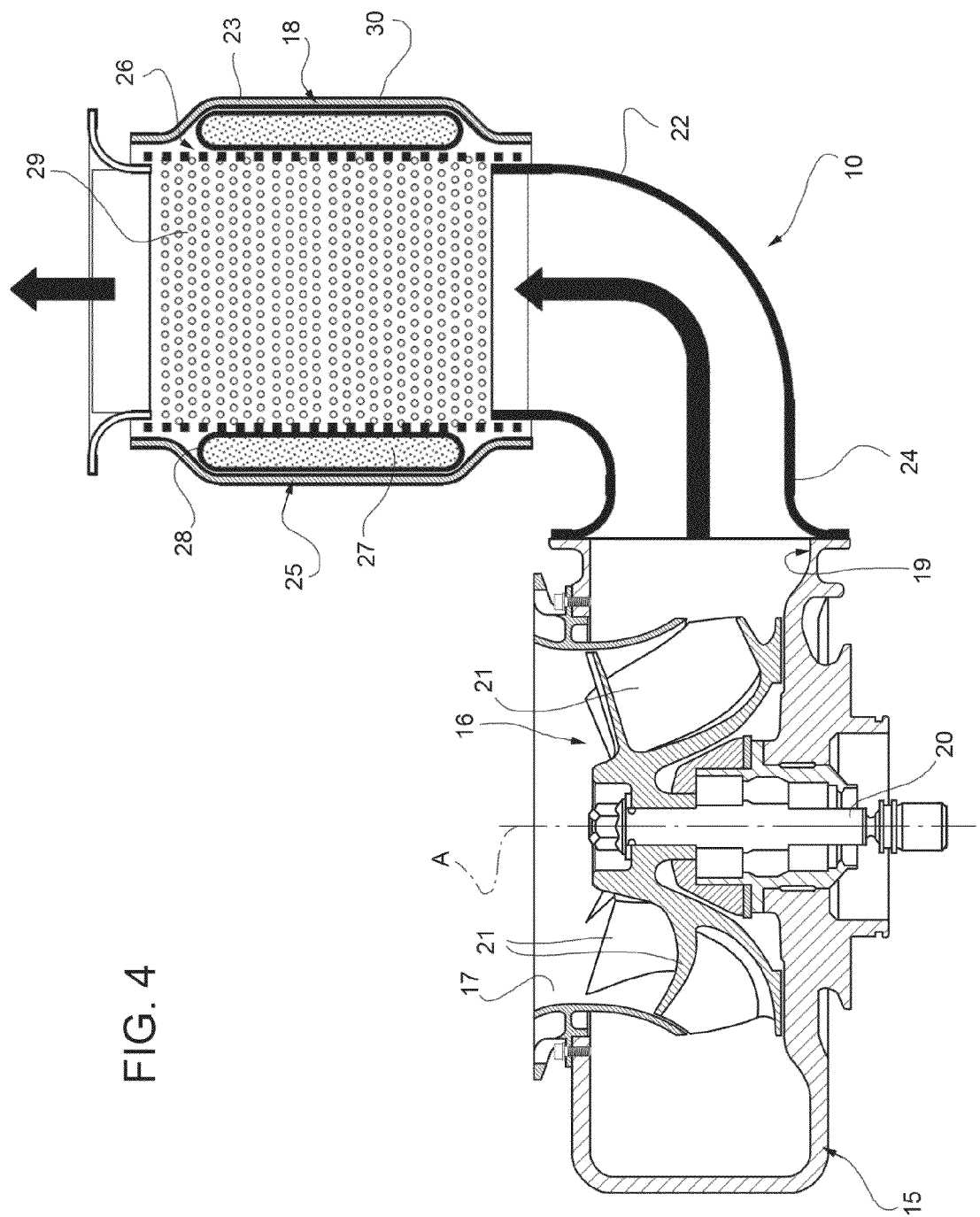
FIG. 4 shows a larger-scale section of the FIG. 3 fan.

As shown in FIGS. 2 to 4, fan 10 is connected to transmission 5 by at least one shaft 14, and is powered by transmission 5 at a constant rotation speed V.

Fan 10 is preferably a mixed-flow, centrifugal type, but may also be an axial-flow or other type.

More specifically, fan 10 substantially comprises a casing 15; an impeller 16 connected to shaft 14 and mounted inside casing 15 to rotate about an axis A; an air inflow section 17 formed on casing 15, coaxially with axis A; and an air exhaust pipe 18 connected to an outflow section 19 formed on casing 15 and positioned radially with respect to axis A.

More specifically, inflow section 17 of fan 10 is fed with hot air from heat exchanger 9; which air is then exhausted to the outside along exhaust pipe 18.

As shown in FIGS. 3 and 4, impeller 16 comprises a central shaft 20 of axis A; and a number of blades 21 fitted to and projecting from shaft 20, and equally spaced about axis A.

In the following description, the number of blades 21 of impeller 16 is simply indicated N.

Exhaust pipe 18 is bounded by a tubular wall 22, which has a main portion 23 extending parallel to axis A; and a branch portion 24, which extends substantially radially with respect to axis A, is connected at one end to outflow section 19 of casing 15, and is connected, at the opposite end, to main portion 23.

Because of the large amount of thermal power produced during operation of helicopter 1, a very high mass airflow is usually demanded of fan 10. As with aircraft components in general, to achieve a compact, lightweight cooling system 8, fans 10 with a very small diameter with respect to axis A and a very high rotation speed V are preferred.

Similarly, heat exchanger 9 has very small air passages (known and not shown) for compactness, and densely packed fins (known and not shown) to increase the lubricant heat exchange surface. All this produces considerable load losses along the air circuit, which must be overcome by the pressure of fan 10 to ensure the correct mass flow through heat exchanger 9.

The Applicant has observed that the significant change in pressure produced as blades 21 of impeller 16 move past outflow section 19 of fan 10 produces sound at a constant frequency $f_0$ equal to the rotation speed V of shaft 20 of impeller 16 multiplied by the number N of blades 21.

The Applicant has also observed that, because of the high rotation speed V, this sound may fall within the audible frequency range and so constitute a noise source both inside and outside the cabin of helicopter 1.

To reduce or eliminate this sound, part of wall 22 of exhaust pipe 18 is advantageously fitted with dissipating means 25 designed to selectively absorb pressure waves in a given frequency band related to the rotation speed V and number N of blades 21 of impeller 16.

In other words, dissipating means 25 serve to prevent said pressure waves from propagating to the outside or inwards of the cabin of helicopter 1.

The frequency band mentioned preferably ranges between 90% and 110% of the frequency value $f_0$ calculated by multiplying the rotation speed V of impeller 16 by the number N of blades 21 of impeller 16.

More specifically, dissipating means 25 are incorporated in wall 22 of exhaust pipe 18. In the example shown, dissipating means 25 are housed inside main portion 23 of wall 22, which, for this purpose, is thicker and defines an inner cavity 26.

As shown in FIG. 4, dissipating means 25 comprise a layer 27 of sound-absorbing material designed to absorb by porosity the pressure waves in said frequency band around frequency value $f_0$.

More specifically, layer 27 of sound-absorbing material is preferably fibre, e.g. glass-fibre, material, or open-cell material such as melamine foam.

Layer 27 of sound-absorbing material has a density related to the rotation speed V and number N of blades 21 of impeller 16, and a volume related to the intensity of the sound for filtration.

Layer 27 of sound-absorbing material is preferably enclosed in a bag 28, e.g. of polyaramidic fabric, permeable to air but impermeable to water.

The sound wave through layer 27 of sound-absorbing material is dissipated by converting sound to kinetic energy.

Dissipating means 25 also comprise a perforated metal sheet 29 defining cavity 26 inwards of exhaust pipe 18, and designed to let the pressure waves through to layer 27 of sound-absorbing material, to produce a preliminary cavity-resonance sound-absorbing effect on the pressure waves.

Perforated metal sheet 29 also protects layer 27 of sound-absorbing material from the speed of the air flowing over it.

Cavity 26 is bounded outwards by a rigid retaining shell 30, preferably made of glass fibre, which is fixed to the rest of wall 22 of exhaust pipe 18, which is preferably made of carbon fibre.

Shell 30 serves to protect layer 27 of sound-absorbing material from physical contact with the adjacent parts of helicopter 1, and to preserve its shape and density in all operating conditions.

In actual use, rotation of impeller 16 about axis A produces airflow through heat exchanger 9 to cool the lubricant flowing from transmission 5 along inlet pipe 12; the cooled lubricant is then fed back to transmission 5 along outlet pipe 13.

The airflow produced by impeller 16 is sucked into inflow section 17 of fan 10, channeled along exhaust pipe 18, and expelled to the outside.

As each blade 21 passes over outflow section 19 of fan 10, it produces a change in pressure, which produces an audible sound of frequency $f_0$ equal to the rotation speed V of impeller 16 multiplied by the number N of blades 21.

The high-frequency pressure components transported by the airflow (on average, constant from fan 10) are first abated by cavity resonance as they pass through the openings in perforated metal sheet 29, and subsequently by deformation of layer 27 of sound-absorbing material.

The pressure at which the airflow is expelled to the outside from exhaust pipe 18 is thus free of the high-frequency components which generate unwanted noise in the audible frequency range.

The advantages of helicopter 1 according to the present invention will be clear from the above description.

In particular, by incorporating dissipating means 25 in wall 22 of exhaust pipe 18, the pressure waves generated as blades 21 of impeller 16 pass over outflow section 19 of casing 15 of fan 10 are absorbed partly as they flow through the openings in perforated metal sheet 29, and partly by deformation of layer 27 of sound-absorbing material. This therefore reduces the change in pressure and the intensity of the sound from cooling system 8.

Clearly, changes may be made to helicopter 1 as described and illustrated herein without, however, departing from the protective scope defined in the accompanying Claims.

The invention claimed is:

1. A hover-capable aircraft (1) comprising:
   propulsion means (6);
   at least one rotor (3);
   transmission means (5) for transmitting power from said propulsion means (6) to said rotor (3) and lubricated with a lubricant;
   a heat exchanger (9), which receives the heated lubricant from said transmission means (5) and feeds the cooled lubricant back to the transmission means (5); and
   a fan (10) for producing airflow through said heat exchanger (9) to cool said lubricant, and which comprises an impeller (16) with blades (21), and an exhaust pipe (18) for expelling the hot air produced by cooling said lubricant;
   wherein at least one portion (23) of an outer delimiting wall (22) of said exhaust pipe (18) incorporates dissipating means (25) designed to selectively absorb pressure waves in a given frequency band related to the rotation speed (V) of said impeller (16) and to the number (N) of blades (21) of the impeller (16), wherein said exhaust pipe defines an internal flow path for the hot air with said dissipating means (25) being disposed laterally with respect to said flow path and in a manner in which said dissipating means 25 encircles at least a portion of the flow path.

2. An aircraft as claimed in claim 1, wherein said frequency band ranges between 90% and 110% of the frequency value ($f_0$) calculated by multiplying the rotation speed (V) of the impeller (16) by the number (N) of blades (21) of the impeller (16) by the number (N) of blades (21) of the impeller (16).

3. An aircraft as claimed in claim 1, wherein said dissipating means (25) comprise a layer (27) of sound-absorbing material designed to absorb said pressure waves by porosity.

4. An aircraft as claimed in claim 3, wherein said layer (27) of sound-absorbing material is a fibre.

5. An aircraft as claimed in claim 3, wherein said layer (27) of sound-absorbing material is housed in a cavity (26) of said wall (22) of said exhaust pipe (18), and said cavity (26) is bounded internally by a perforated surface (29) designed to let said pressure waves through to said layer (27) of sound-absorbing material to produce a preliminary cavity-resonance sound-absorbing effect on the pressure waves.

6. An aircraft as claimed in claim 5, wherein said cavity (26) is bounded externally by a rigid retaining shell (30).

7. An aircraft as claimed in claim 1, wherein said impeller (16) of said fan (10) is powered by said transmission means (5).

8. A hover-capable aircraft (1) comprising:
propulsion means (6);
at least one rotor (3);
transmission means (5) for transmitting power from said propulsion means (6) to said rotor (3) and lubricated with a lubricant;
a heat exchanger (9), which receives the heated lubricant from said transmission means (5) and feeds the cooled lubricant back to the transmission means (5); and
a fan (10) for producing airflow through said heat exchanger (9) to cool said lubricant, and which comprises an impeller (16) with blades (21), and an exhaust pipe (18) for expelling the hot air produced by cooling said lubricant, wherein said exhaust pipe (18) comprises a hollow structure that defines a flow path for the hot air, whereby the hot air flows along a longitudinal axis of said exhaust pipe;
wherein at least one portion (23) of an outer delimiting wall (22) of said exhaust pipe (18) incorporates dissipating means (25) designed to selectively absorb pressure waves in a given frequency band related to the rotation speed (V) of said impeller (16) and to the number (N) of blades (21) of the impeller (16), wherein said dissipating means (25) is disposed radially outward from the flow path and said longitudinal axis does not intersect said dissipating means (25).

9. An aircraft as claimed in claim 8, wherein said dissipating means (25) circumferentially surrounds the flow path.

* * * * *